(12) United States Patent
Choules et al.

(10) Patent No.: US 11,526,596 B2
(45) Date of Patent: *Dec. 13, 2022

(54) REMOTE PROCESSING OF CREDENTIAL REQUESTS

(71) Applicant: Digicert, Inc., Lehi, UT (US)

(72) Inventors: Wade Johnathon Choules, Santaquin, UT (US); Darin Scott Andrew, Payson, UT (US); Ricky Eldon Roos, Highland, UT (US); Jason Allen Sabin, Lehi, UT (US); Daniel Robert Timpson, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,617

(22) Filed: Nov. 10, 2020

(65) Prior Publication Data

US 2021/0056198 A1 Feb. 25, 2021

Related U.S. Application Data

(63) Continuation of application No. 16/044,350, filed on Jul. 24, 2018, now Pat. No. 10,846,392.

(60) Provisional application No. 62/536,227, filed on Jul. 24, 2017.

(51) Int. Cl.
| | |
|---|---|
| G06F 21/45 | (2013.01) |
| H04L 9/32 | (2006.01) |
| H04L 9/40 | (2022.01) |
| H04L 9/08 | (2006.01) |
| G06F 21/44 | (2013.01) |

(52) U.S. Cl.
CPC .............. *G06F 21/45* (2013.01); *G06F 21/44* (2013.01); *H04L 9/088* (2013.01); *H04L 9/321* (2013.01); *H04L 9/3268* (2013.01); *H04L 63/0823* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,564,320 B1 | 5/2003 | de Silva et al. | |
| 7,904,951 B1 | 3/2011 | Ebrahim et al. | |
| 8,467,290 B2 | 6/2013 | Gazier et al. | |
| 9,137,226 B2 | 9/2015 | Zhu et al. | |
| (Continued) | | | |

*Primary Examiner* — Nelson S. Giddins
(74) *Attorney, Agent, or Firm* — Knobbe, Martens, Olson & Bear, LLP

(57) ABSTRACT

A method, system and apparatus for requesting a plurality of credentials from a trusted entity. A local validation device (LVD) receives a credential request or an identifier from each of a plurality of user devices. The LVD generates or compiles a bundle of credential requests corresponding to the plurality of user devices. The LVD transmits the bundle of credentials requests to the MVD. The MVD receives the bundle of request and performs a validation for each request in the bundle and then communicates the credentials and/or the results of the validations to the LVD. The LVD communicates credentials to each of the plurality of user devices. In some cases, the LVD performs the validation for each credential request. For instance, the LVD can receive a local enforcement policy from the MVD, which can provide instructions or guidance to the LVD as to how to perform the validations.

20 Claims, 10 Drawing Sheets

(56) References Cited

U.S. PATENT DOCUMENTS

| | | |
|---|---|---|
| 9,172,545 B2 | 10/2015 | Edstrom et al. |
| 9,239,911 B2 | 1/2016 | Duryee et al. |
| 9,800,568 B1 | 10/2017 | Moses et al. |
| 10,447,683 B1 | 10/2019 | Loladia |
| 2010/0049970 A1 | 2/2010 | Fraleigh et al. |
| 2013/0086377 A1 | 4/2013 | Cilfone et al. |
| 2014/0230029 A1* | 8/2014 | Campagna ............ H04L 9/0841 726/6 |
| 2018/0278607 A1* | 9/2018 | Loladia ............... H04L 63/0823 |
| 2020/0059762 A1* | 2/2020 | McHugh ................ H04W 4/08 |

* cited by examiner

REMOTE PROCESSING OF CREDENTIAL REQUESTS

RELATED APPLICATIONS

This application is a continuation of U.S. patent application Ser. No. 16/044,350, filed Jul. 24, 2018, entitled "REMOTE PROCESSING OF CREDENTIAL REQUESTS," which claims the benefit of priority of U.S. Provisional Patent Application No. 62/536,227, filed Jul. 24, 2017, entitled "REMOTE PROCESSING OF CREDENTIAL REQUESTS," each of which is hereby incorporated by reference herein in its entirety and for all purposes.

BACKGROUND

The present disclosure relates generally to the field of validating devices for use in network communications.

BRIEF DESCRIPTION OF THE DRAWINGS

The following drawings and the associated descriptions are provided to illustrate embodiments of the present disclosure and do not limit the scope of the claims.

Figure 1:
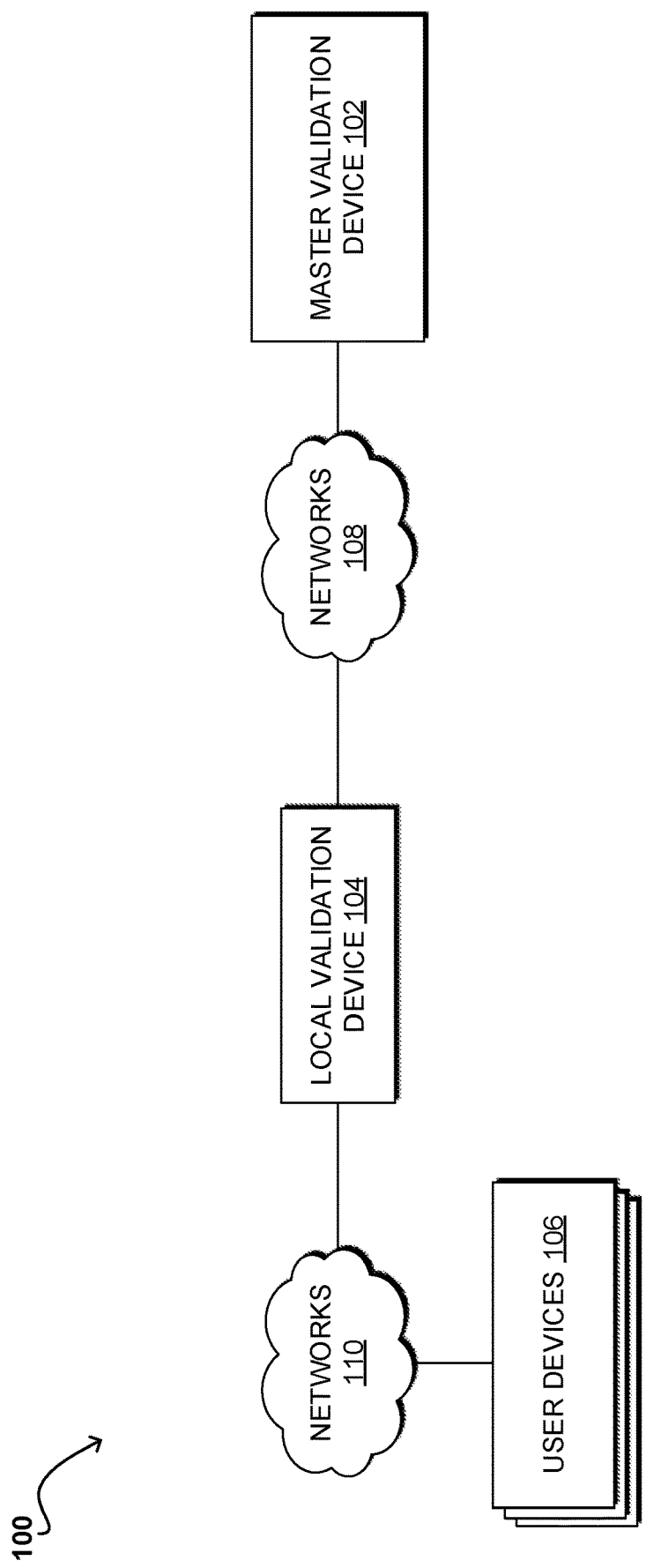
FIG. 1 is a block diagram illustrative of an embodiment of an environment for validating user devices.

While the foregoing "Brief Description of the Drawings" references generally various embodiments of the disclosure, an artisan will recognize from the disclosure herein that such embodiments are not mutually exclusive. Rather, the artisan would recognize a myriad of combinations of some or all of such embodiments.

DETAILED DESCRIPTION

Overview

One concern associated with sales or other transactions over a network such as the Internet is how to verify the identity of a party to a transaction (and whether that party is trustworthy). A general approach to assuring the identity of parties of a transaction, log-in, or other matter necessitating or desiring authentication in a network environment is the employment of a certification procedure. For example, a certificate authority (CA) can act as a digital analogue to a notary public—to certify that a digital signature in fact belongs to the entity identified in the credential, according to criteria that would allow the use of that signature in the relevant application. However, when a user device desires authentication (e.g., a credential) it can sometimes be difficult for the user device to establish a connection with the CA. For example, the CA may be "offline" or the connection may otherwise be unavailable. Similarly, there may be a significant number of user devices from a common source that require a credential.

To address some of these issues, an authentication environment can include a local validation device (LVD) in addition to a master validation device (MVD) (e.g., a CA). The LVD can communicate with the user devices via a network, such as a network, such as a local area network (LAN) or wide area network (WAN), and can monitor a connection between itself and the master validation device. In some cases, the user devices may be user devices being manufactured at a facility with intermittent access to wide area networks such as the Internet. In some cases, the user devices may be devices being added to a local network at a location or facility with intermittent access to wide area networks (e.g., due to a remote location, poor infrastructure, security restrictions, etc.). As another example, the user devices may be internet of things (IoT) devices and the local validation device may facilitate credentialing of the IoT devices. As an additional example, a network user may be at a site with intermittent, spotty, and/or restricted wide area network access and a local validation device as described herein may facilitate provisioning the network user with a network credential in spite of the network limitations. In such cases, it can be beneficial to have a local validation device that can bundle together credential requests, can store credential requests when access is unavailable to wide area networks such as the Internet (and thus potentially access to the relevant certificate authority), provide or forward credential requests to a certificate authority (e.g., when a connection to the certificate authority become available), validate or pre-validate user devices, provide limited certificates to the user devices, and/or distribute certificates from a certificate authority to the user devices. However and as the local validation device may not be fully controlled by the certificate authority, it may be desirable to provide protections to ensure that certificates from the certificate authority are not misused. As a result, it can be beneficial for the certificate authority to retain a part in the process of validating credential requests and generating credentials for the user devices. Additionally, it can be beneficial for the certificate authority to provide a local enforcement policy, which may be a set of procedures and policies the local validation component is required to conform to in order to protect against misuse of credentials from the certificate authority (e.g., to ensure that additional user devices are not manufactured or added to a network without the knowledge of the certificate authority, that fraudulent certificates are not generated by the local validation component, that certificates are distributed to the proper user devices, etc.).

In certain cases, the LVD can receive device identifiers and/or credential requests from a plurality of user devices and can be configured to store each of the identifiers and/or credential requests until, for instance, a connection can be established between the LVD and the MVD. Upon an occurrence of an event, such as the expiration of a time interval or a determination that a connection exists or can be established between the LVD and the MVD, the LVD can send a bundle of credential requests associated with the user devices to the MVD to be validated.

In some cases, the LVD can generate device identifiers for the user devices without receiving a credential request from the user devices. The LVD can then create a bundle of credential requests corresponding to the identifiers. Alternatively or in addition, the LVD can pre-request credentials from MVD. In response, the MVD can perform the validations and issue the credentials. The pre-requested credentials can correspond to the identifiers generated by the LVD. When a user device requests a credential, the LVD can perform a local validation prior to sending one of the pre-requested credentials to the user device.

Similarly, the MVD can generate device identifiers for the user devices without receiving a credential request from the user devices or an LVD. The MVD can pre-validate a plurality of devices corresponding to the device identifiers. When the LVD requests the credentials from the MVD by, the MVD can communicate the results of the pre-validation and/or the credentials from the pre-validation to the LVD. When a user device requests a credential, the LVD can perform a local validation and then issue the credential to the user device.

In some embodiments, the LVD can itself validate or pre-validate one or more credential requests from the user devices. For example, LVD can request and/or receive a local enforcement policy from the MVD, which can provide instructions or guidance to the LVD as to how to perform validations or which or how many devices can be validated. Accordingly, the LVD can approve or deny a credential request from the user devices by performing a validation based on the local enforcement policy received from the MVD. In some cases, the LVD can validate the local enforcement policy prior to validating the one or more credential requests from user devices. In some embodiments, after the LVD validates the credential requests, the MVD validates the local enforcement policy used by the LVD and/or validates the credential requests.

Environment Overview

FIG. 1 is a block diagram illustrative of an embodiment of an environment 100 for bundling credential requests and/or performing pre-validation or local validations on user devices. In the illustrated embodiment, the environment 100 includes one or more user devices 106, a local validation device (LVD) 104 (sometimes referred to as a broker), and a master validation device (MVD) 102 (sometimes referred to as a certificate authority (CA), a trusted entity, or a cert. central). The environment 100 in the illustrated embodiment further includes one or more networks 110 configured to provide communication links between the user devices 106 and the LVD 104 and one or more networks 108 configured to provide communication links between the LVD 104 and the MVD 102.

The user devices 106 can be implemented using one or more, cell phones, smart phones, tablets, computers, laptops, servers, chips, tracking devices, targeting devices, weapons systems, mobile computing device, any electronic device configured to communicate with a network (non-limiting examples: a cellular network or other wireless network, or wired network), and/or any device configured for the internet of things. As such, the user devices 106 can include a processor and data store (non-limiting example: non-transitory computer-readable media) that includes computer-executable instructions that when executed by the processor cause the processor to perform a number of functions, programs, applications, and/or services. The user devices 106 can also include a transceiver and an antenna to provide wireless communication, as well as a screen, input and output components, etc.

The MVD 102 can be implemented as one or more computing devices, such as one or more servers (such as a cluster of servers on the cloud), a gateway, etc. The MVD 102 can be located remotely from or locally to the LVD 104. In some embodiments, the MVD 102 is a trusted entity that can certify or authenticate a user device 106, and perform various functions including, but not limited to, authenticating a LVD 104, verifying an identity of a user device 106, issuing credentials, generating or providing master policies, validating policies used by a LVD 104, generating identifiers, providing alerts, and the like.

The MVD 102 can also store credentials for issuing to user devices, including, but not limited to, certificates, keys, public/private keys, signed data, signatures, tokens, authentication factor, signed assertions, assertion rules, or other information that can be used identify a device, etc. The MVD 102 can further store policies, such as master policies for validating user devices or processing credential requests from user devices, hashes of policies, etc. The policies can include rules regarding certain domains or IP addresses that can receive credentials, an offline mode for accessing credentials, identities of devices that can that perform authentication, etc. In addition, the MVD 102 can include authentication information about the LVD 104, enable users to register with it, set tasks for the LVD 104, monitor events, include monitor logs, monitor the issuance and lifecycle of credentials, etc.

The LVD 104 can be implemented as one or more computing devices, such as one or more servers (such as a proxy server or a cluster of servers on the cloud), a gateway, etc. The LVD 104 can be located remotely from or locally to the MVD 102. The LVD 104 performs various functions including, but not limited to, receiving a credential request corresponding to a user device 106, generating a credential request, storing user device identifiers, credential requests, or credentials, verifying an identity of an user device, receiving a local enforcement policy, generating user device identifiers, providing alerts, and the like.

The one or more networks 108, 110 can include at least one of a cellular network, Wi-Fi network, a local area network (LAN), a wide area network (WAN), the Internet, etc. In some embodiments, the one or more networks 108 and the one or more networks 110 include different networks. For example, the network 110 can be a LAN or WAN behind a firewall and the network 108 can be a WAN, such as the Internet. In some instances, the one or more networks 108 and the one or more networks 110 include at least one of the same networks.

Bundling of Information for Certificate Requests

Figure 2:
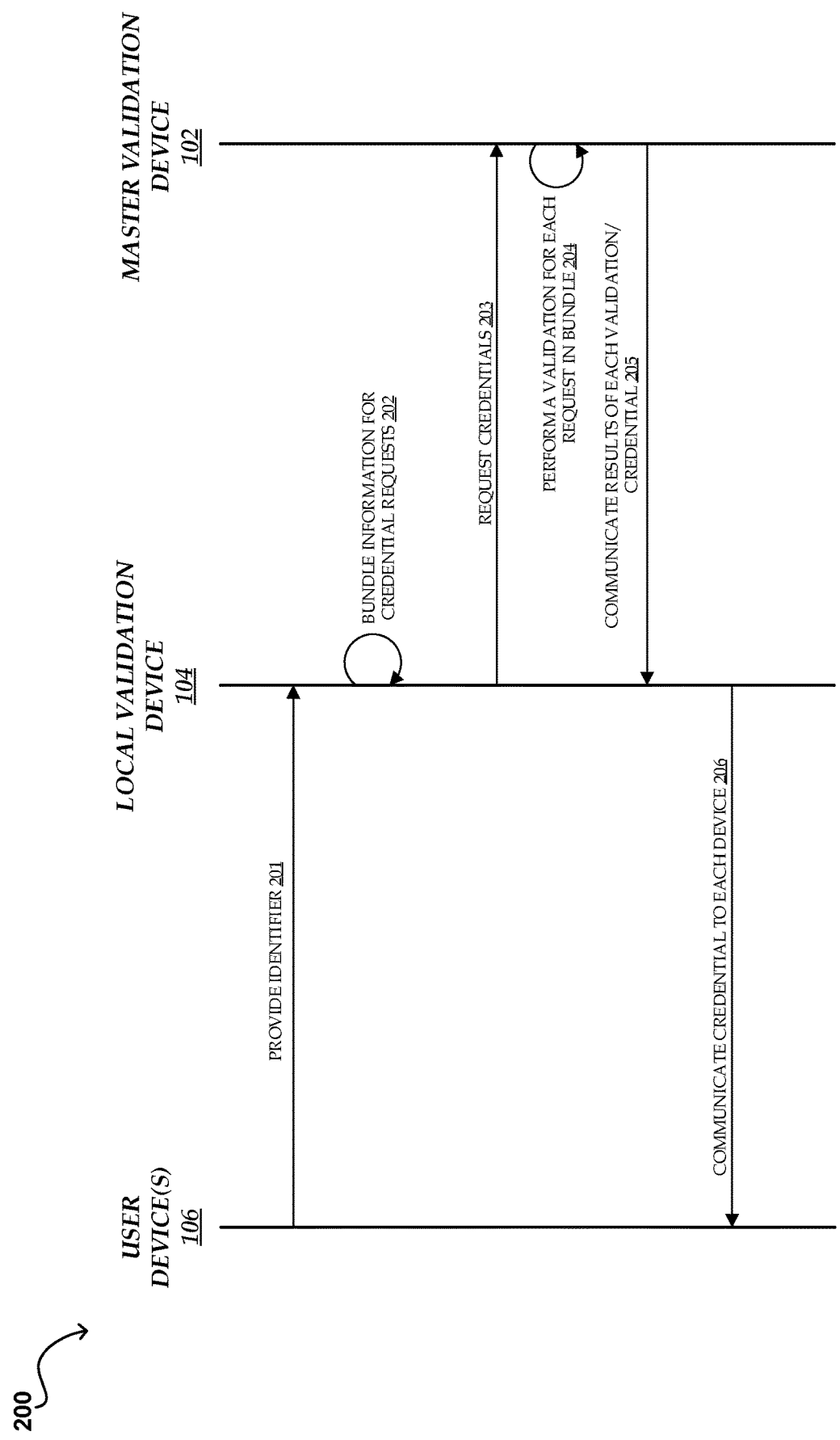
FIG. 2 is a data flow diagram illustrative of an embodiment of bundling information for credential requests.

FIG. 2 is a data flow diagram illustrative of an embodiment of bundling information for credential requests using device identifiers received from user devices 106. Although FIG. 2 only shows interactions between the MVD 102, LVD 104, and user devices 106, it will be understood that the environment 200 can include fewer or more components as desired and/or be configured differently. For example, additional communications can occur between the devices 102, 104, 106, and/or additional components can be used to communicate the data between the illustrated devices 102, 104, 106.

At 201, one or more user devices 106 communicate with an LVD 104. In some embodiments, as part of the communication, the user devices 106 provide the LVD 104 with a plurality of device identifiers, such as an identifier associated with each of the user devices 106. The device identifiers can provide an indication of an identity of the user devices 106 (such as a unique identifier), an indication of an identity of a customer or user, or other indication. For example, the one or more identifiers can include any one or any combination of a MAC address, processor ID, domain name, device name, random string, unique identifier, or customer assigned identifier, and the like.

In some embodiments, the user devices 106 communicate with the LVD 104 over one or more networks, such as cellular network, Wi-Fi network, LAN or WAN. In certain embodiments, the user devices 106 initiate communications with the LVD 104 based at least in part on user interaction. For example, a user device 106 can communicate with the LVD 104 in response to a user activating the user device 106.

At 202, the LVD 104 bundles information for credential requests. In some cases, the LVD 104 receives the device identifiers from the user devices 106 and generates a plurality of credential requests based at least in part on the identifiers. The credential requests can include, but are not limited to, an identifier corresponding to a user device 106, an identifier corresponding to the LVD 104, an identifier of the user device 106, a policy identifier, or policy information (non-limiting examples: a policy identifier, an organization name, an entity identifier, a legal identity identifier, key usage information, extended key usage information, an identity of an issuing certificate authority, length of time for which the credential will be valid, an identification of a signing algorithm, an identification of an encryption algorithm, an identification of a hashing algorithm, certificate revocation list information, etc.).

The LVD 104 can store (e.g., locally or remotely) the credential requests or device identifiers in memory, and can forward or transmit the credential requests or identifiers to the MVD 102. In some cases, the LVD 104 can monitor a network connection between itself and the MVD 102, and can store the requests or identifiers in memory until the LVD 104 can communicate with the MVD 102, at which time it sends the requests of identifiers to the MVD 102. In some instances, the LVD 104 can bundle the credential information together, for instance, by storing it in a single file or location (for example, in a csv file) or by locally encrypting the information. By bundling the credential information together, the LVD 104 can send the credential requests to the MVD 102 as part of a single communication. Thus, the credential requests can be sent simultaneously to the MVD 102 for validation, rather than sending a different request for each credential.

At 203, the LVD 104 communicates with the MVD 104. As part of the communication, the LVD 104 requests credentials from the MVD 102 for the user devices 106. As described herein, the LVD 104 can bundle credential requests and/or information. Thus, the LVD 104 can send the bundled requests to request a plurality (e.g. a bundle) of credentials for the user devices 106. In some cases, the LVD 104 requests the credentials when it detects that it can communicate with the MVD 102. For example, as mentioned previously, in some cases, the network connection between the LVD 104 and MVD 102 may not be reliable or may only be available intermittently. Accordingly, in some cases, when the LVD 104 determines that it can communicate with the MVD 102, it can request credentials for the user devices 106.

In certain cases, the LVD 104 can request credentials from the MVD 102 when a threshold number of user devices 106 has requested credentials. The threshold number can be set by a user or can correspond to the number of user devices manufactured or the number of user devices added to a network within a certain period of time. For example, the LVD 104 can wait until 1,000 devices have requested a credential before requesting credentials from the MVD 102. Similarly, the LVD 104 can bundle the requests based on a time period. For example, the LVD 104 can bundle the requests received from user devices 106 each day or week and request the credentials from the MVD 102 at the end of the day or week.

At 204, the MVD 102 performs a validation for each of the credential requests in the bundle. The MVD 102 can issue credentials upon comparison and verification of data submitted with a credential request against registered data. The validations can include various verifications such as a verification of the identities of the user devices 106 or the LVD 104. For example, the MVD 102 can use a set of rules that, if passed, verify the user devices 106 or the LVD 104 and permit the issuance of a credential. In some cases, the set of rules can include, but is not limited to, an ownership requirement (e.g., a user device 106 owns a particular domain); a point-of-presence requirement (e.g., a user device 106 has a particular IP address, a user device's IP address falls within a certain range of IP addresses); a white list requirement (e.g., a requirement that the user devices 106 or LVD 104 correspond to a list of acceptable email addresses, users, passwords, URLs, IP addresses, domain names, file hashes, etc.); or a black list requirement (e.g., a requirements that the user devices 106 or LVD 104 do not correspond to entries such as email addresses, users, passwords, URLs, IP addresses, domain names, file hashes, etc.). In some cases, a credential can be issued if, among other things, the identities of the user devices 106 (or LVD 104) correspond to an acceptable string length, have an acceptable length of information, or include an acceptable date format. In some cases, the credentials can be validated if a credential signing request (CSR) is passed.

At 205, the MVD 102 communicates results of each validation and/or communicates credentials to the LVD 104. For example, validation results can include an indication of whether or not a user device 106 was validated. In some cases, for example, if credentials are issued, the MVD 102 can send the credentials (e.g., as a bundle) to the LVD 104. The credentials can include, but are not limited to, any one or any combination of: information identifying the user devices 106, public keys, information identifying the MVD 102 (e.g., information encrypted with the MVD's private key), Secure Sockets Layer (SSL) certificates, virtual private network (VPN) certificates, etc.

At 206, the LVD 104 communicates with each of the user devices 106. For example, the LVD 104 can communicate the results of each validation and/or the credentials to the user devices 106. In some embodiments, the LVD 104 communicates the results to fewer than all of the user devices 106. For instance, the LVD 104 may only communicate with user devices 106 which have been validated (e.g., a user device 106 for which a credential has been issued). In some embodiments, the LVD 104 can communicate the results/credentials to a single device or a few devices, and those devices can distribute the results to one or more other user devices 106.

Depending on the embodiment, certain acts, events, blocks, communications or functions identified above can be performed in a different sequence, can be added, merged, or left out altogether (non-limiting example: not all described operations or events are necessary). For example, in some cases, the user devices 106 directly or indirectly requests credentials from the MVD 102. In examples such as these, the MVD 102 can, similar to event 204, perform a validation for each request and generate credentials. The LVD 104 can later communicate a request to the MVD 102, asking if any credentials are available for distribution to the user devices 106. In addition, in some cases, any one or any combination of events 201, 202, 203, 204, 205 or 206 can be omitted. Further, in some embodiments, the user devices 106 may not send communications to the LVD 104 prior to the LVD 104 requesting credentials. For instance, the LVD 104 can request credentials at regular intervals or upon the occurrence of a certain event, such as when the LVD 104 can access the internet or a certain network. Moreover, in certain embodiments, operations or events can be performed concurrently. For example, the LVD 104 can concurrently receive an identifier from the user devices 106 and bundle information for credential requests.

In some embodiments, the LVD 104 can provide the user devices 106 with a limited credential, such as a credential that authenticates the user devices 106 with the LVD 104 or within a particular network, but may not authenticate the user devices 106 on other networks, such as a wide-area network or the Internet, or with other devices, such as the MVD 102. Further, the limited credential may be limited in time, such that it is replaced after a predetermined time or with a longer-term credential received from the MVD 102. The limited credential may also be referred to as a manufacturer credential and may be digitally signed by the LVD 104 and/or a manufacturer (e.g., a person or entity manufacturing the user devices and/or providing the local validation device). Limited credentials may be used by the user devices 106 in communicating with other devices such as other user devices 106, the LVD 104, and the MVD 102. In some instances, the limited credentials may be replaced by credentials from the MVD 102 (or LVD 104 in embodiments in which the LVD 104 generates credentials), when the credentials from the MVD 102 are generated and provided to the user devices 106 as described herein.

In some cases, prior to providing the limited credential to a user device, the LVD 104 can validate the user device. The validation can be similar to the pre-validation performed in associated with the credential request that is to be sent to the MVD 102. For example, the LVD 104 can verify an identifier or other information of the user device with information received from the MVD 102 (e.g., a local enforcement policy) or other information (e.g., list of identifiers received from a manufacturer, etc.). Once validated, the LVD 104 can generate and/or communicate the limited credential to the user device(s) 106. In some cases, the limited credential can include a digital certificate signed by the LVD 104. Moreover, in some embodiments, the LVD 104 can indicate that the limited credential is to terminate after a predetermined time period, upon the occurrence of a particular event, or is to remain until it is replaced with another credential. Furthermore, the LVD 104 can use the limited credential to identify or validate a user device 106 before distributing a credential received from the MVD 102 to the user device 106.

Furthermore, any one or any combination of the activities described above can occur automatically and/or without user input. For example, the user devices 106 can request access to a network or provide identifier(s) the LVD 104 without user input.

Figure 3:
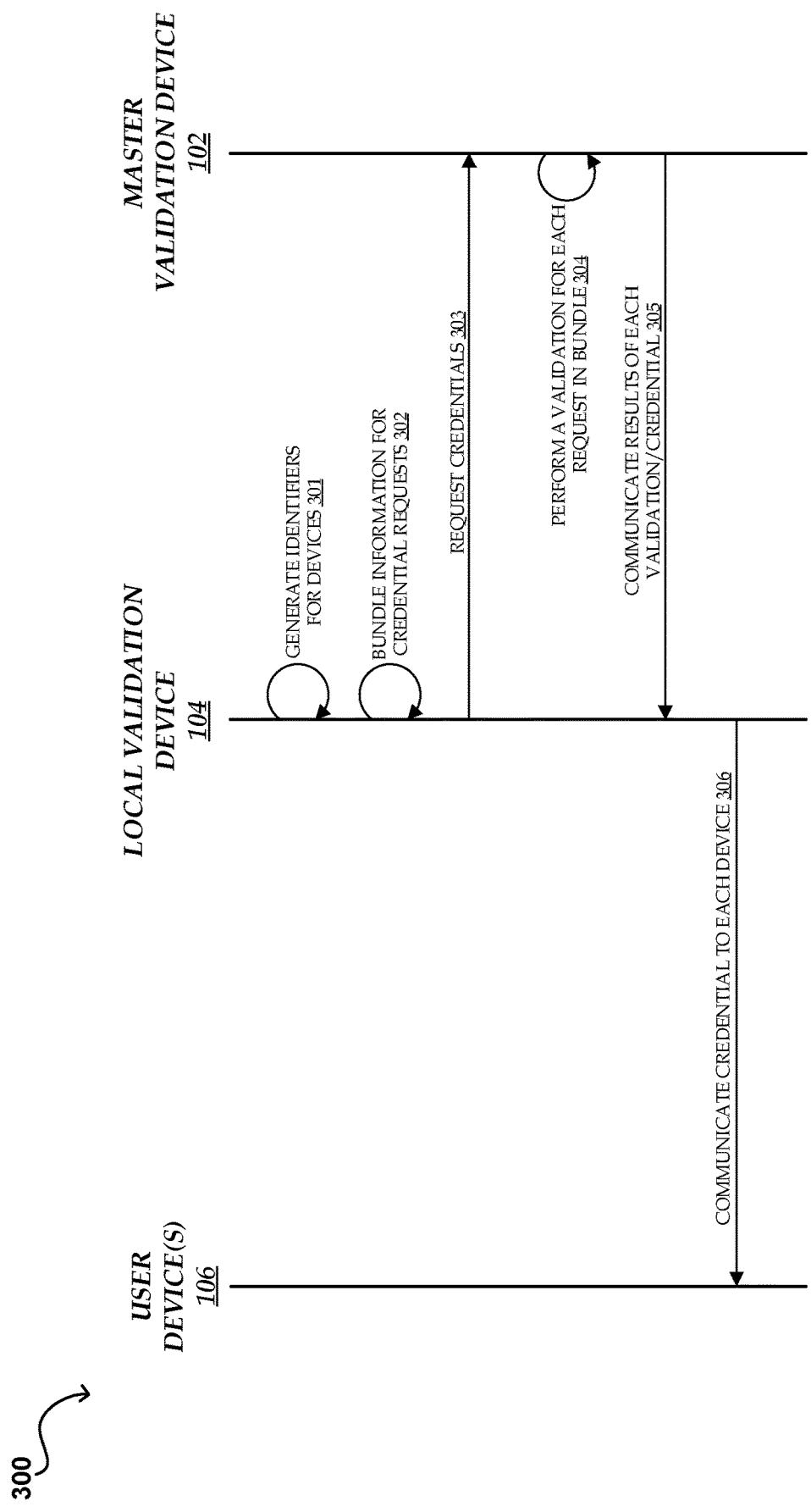
FIG. 3 is a data flow diagram illustrative of an embodiment of bundling information for credential requests using identifiers generated by a local validation device.

FIG. 3 is a data flow diagram illustrative of an embodiment of bundling information for credential requests using identifiers generated by the LVD 104. Although FIG. 3 only shows interactions between the MVD 102, LVD 104, and user devices 106, it will be understood that the environment 300 can include fewer or more components as desired and/or be configured differently. For example, additional communications can occur between the devices 102, 104, 106, and/or additional components can be used to communicate the data between the illustrated devices 102, 104, 106.

At 301, the LVD 104 generates a plurality of device identifiers for a plurality of user devices 106. In some embodiments, the LVD 104 can generate the device identifiers before communicating with the user devices 106. For example, a user can access the LVD 104 and request that a certain number of credentials be generated for user devices 106. In some cases, the LVD 104 can generate the identifiers based on an expected number of user devices that are to be manufactured or of user devices that are to be added to a local network or that will request credentials within a certain time period. For example, the LVD 104 can preemptively generate identifiers based on an estimated number of devices that are to be manufactured or devices that are to be added to a local network or that are to request a credential in a week or prior to the next time that the LVD 104 can access the MVD 102. As such, the LVD 104 can preemptively or anticipatorily generate device identifiers for user devices 106 which may request credentials at a later time. The LVD 104 can then assign an identifier to the user devices 106 upon communication with the user devices 106. In addition or alternatively, the LVD 104 may generate an identifier in response to a request by a user device 106. The request by the user devices 106 can be a request for an identifier, a credential request, or other request.

The device identifiers can be any type of identifier and can be sequentially or randomly generated by the LVD 104. The identifiers can provide an indication of an identity of a device (such as a unique identifier), an indication of an identity of a customer or user, or other indication.

At 302, similar to event 202 of FIG. 2, the LVD 104 can generate a plurality of credential requests corresponding to the plurality of device identifiers, store the identifiers or credential requests in memory, and/or bundle the information for credential requests. For example, if 2,000 devices each week are expected to request credentials, the LVD 104 can preemptively generate identifiers and credential requests for the devices.

At 303, similar to event 203 of FIG. 2, the LVD 104 communicates with the MVD 102 to request credentials for the user devices 106. Additionally, in some cases, the LVD 104 can bundle credential requests and/or information. Thus, the LVD 104 can send the bundled requests to request a plurality (e.g. a bundle) of credentials for the user devices 106. In some cases, the LVD 104 requests the credentials when it detects that it can communicate with the MVD 102. For example, as mentioned previously, in some cases, the network connection between the LVD 104 and MVD 102 may not be reliable or may only be available intermittently. Accordingly, in some embodiments, when the LVD 104 determines that it can communicate with the MVD 102, it can request credentials for the user devices 106.

At 304, similar to event 204 of FIG. 2, the MVD 102 performs a validation for each request in the bundle of credential requests. At 305, similar to event 205 of FIG. 2, the MVD 102 communicates results of each validation and/or communicates credentials to the LVD 104. At 306, similar to event 206 of FIG. 2, the LVD 104 communicates credentials to each of the user devices 106. In addition, the LVD 104 can communicate the identifier to the user devices 106.

Depending on the embodiment, certain acts, events, blocks, communications or functions identified above can be performed in a different sequence, can be added, merged, or left out altogether (non-limiting example: not all described operations or events are necessary). For example, in some cases, any one or any combination of events 301, 302, 303, 304, 305, or 306 can be omitted. Moreover, in certain embodiments, operations or events can be performed concurrently. For example, the LVD 104 can concurrently generate an identifier for the user devices 106 and bundle information for credential requests. In some embodiments, the LVD 104 can provide the user devices 106 with a limited credential until a credential is received from the MVD 102. Furthermore, any one or any combination of the activities described above can occur automatically and/or without user input.

Figure 4:
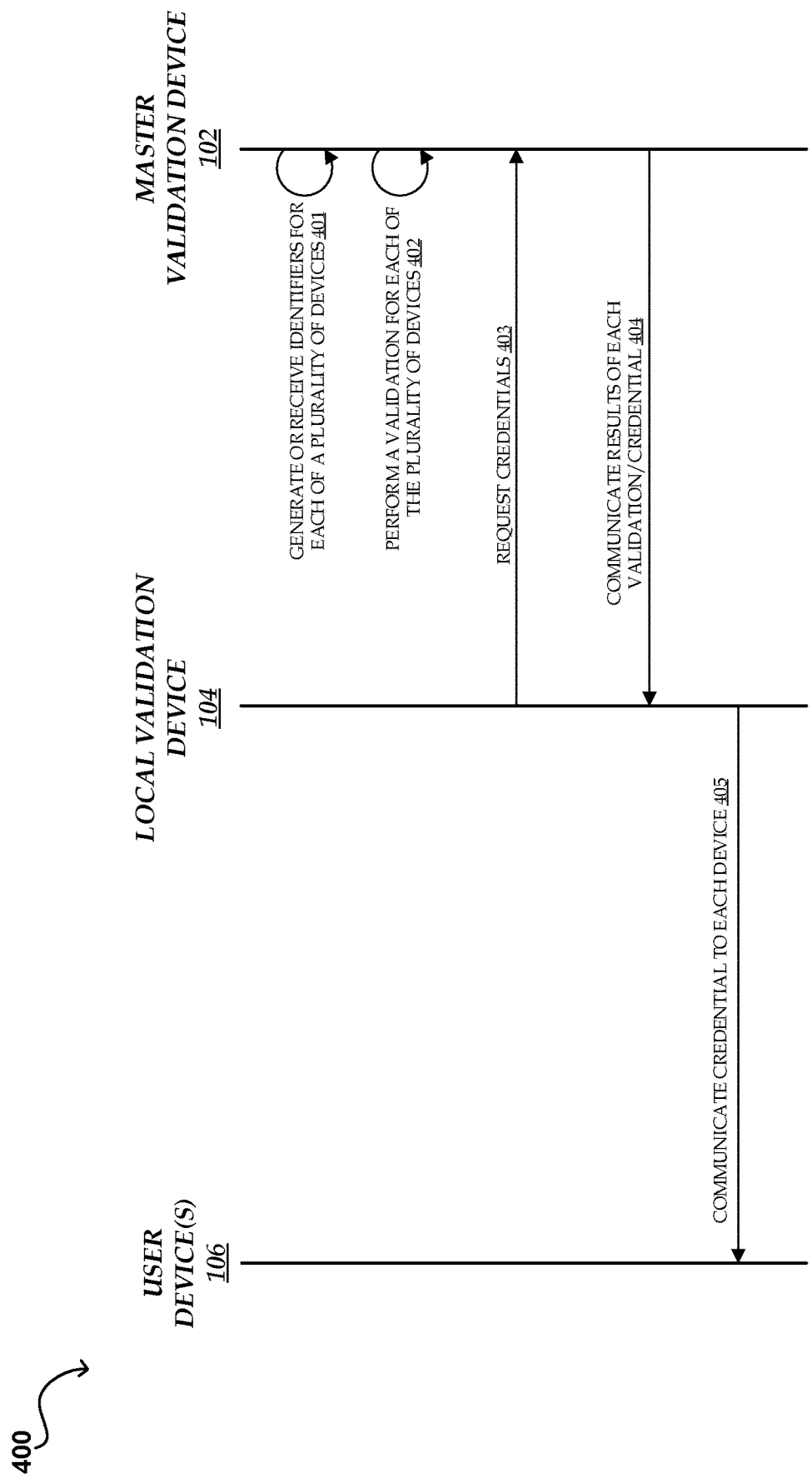
FIG. 4 is a data flow diagram illustrative of an embodiment of bundling information for credential requests using identifiers generated by a master validation device.

FIG. 4 is a data flow diagram illustrative of an embodiment of bundling information for credential requests using identifiers generated by the MVD 102. Although FIG. 4 only shows interactions between the MVD 102, LVD 104, and user devices 106, it will be understood that the environment 400 can include fewer or more components as desired and/or be configured differently. For example, additional communications can occur between the devices 102, 104, 106, and/or additional components can be used to communicate the data between the illustrated devices 102, 104, 106.

At 401, the MVD 102 generates device identifiers corresponding to a plurality of user devices 106. Similar to what is described herein with respect to the device identifiers generated by the LVD 104 (event 301 of FIG. 3), in some embodiments, the MVD 102 can generate the device identifiers prior to communicating with the user devices 106 or the LVD 104. For example, a user can access the MVD 102, directly or via the network 108, and request that a certain number of credentials be generated for user devices 106. As such, the MVD 102 can preemptively or anticipatorily generate device identifiers for the user devices 106 which may request credentials (e.g., directly or indirectly from the MVD 102) at a later time. The MVD 102 (or the LVD 104) can then assign an identifier to a user device 106 upon communication.

The device identifiers generated by the MVD 102 can be any type of identifier and can be generated sequentially or randomly by the MVD 102. The device identifiers can provide an indication of an identity of a device (such as a unique identifier), an indication of an identity of a customer or user, an indication of an identity of the LVD 104, or other indication.

At 402, the MVD 102 performs a validation corresponding to the plurality of device identifiers. For example, the MVD 102 can preemptively or anticipatorily validate a device identifier and/or generate a credential corresponding to the validated device identifier. Thus, for example, when a user device 106 later requests a credential, the user device 106 can be given a device identifier and a valid credential. Similar to event 204 of FIG. 2, the MVD 102 can perform a validation for each of the plurality of user devices/device identifiers.

At 403, similar to event 203 of FIG. 2, the LVD 104 communicates with the MVD 102 to request credentials from the MVD 102. In some cases, the LVD 104 can request all of the credentials that are available for download or a subset of available credentials. In certain embodiments, the LVD 104 can request credentials based on requests received from user devices 106. For example, if the MVD 102 has been tasked with generating 10,000 credentials for the user devices 106 (and 6,000 are available), but only 2,000 user devices 106 are ready to receive the credentials, the LVD 104 can request 2,000 credentials for the user devices 106 that are ready for them or request the 6,000 credentials that are ready for download.

At 404, similar to event 205 of FIG. 2, the MVD 102 communicates results of each validation and/or communicates credentials to the LVD 104. At 405, similar to event 206 of FIG. 2, the LVD 104 communicates credentials to each of the user devices 106. As described above, in some instances, the user devices 106 do not have an identity (e.g., no associated device identifier). Accordingly, in addition to communicating a credential to the user devices 106, the LVD 104 can also communicate the device identifier which the user devices 106 may assume as its identity.

Depending on the embodiment, certain acts, events, blocks, communications or functions identified above can be performed in a different sequence, can be added, merged, or left out altogether (non-limiting example: not all described operations or events are necessary). For example, in some cases, any one or any combination of the events 401, 402, 403, 404, or 405 can be omitted. Moreover, in certain embodiments, operations or events can be performed concurrently. For example, the MVD 102 can concurrently generate or receive an identifier and perform a validation. Furthermore, any one or any combination of the activities described above can occur automatically and/or without user input.

Credential Distribution

Figure 5:
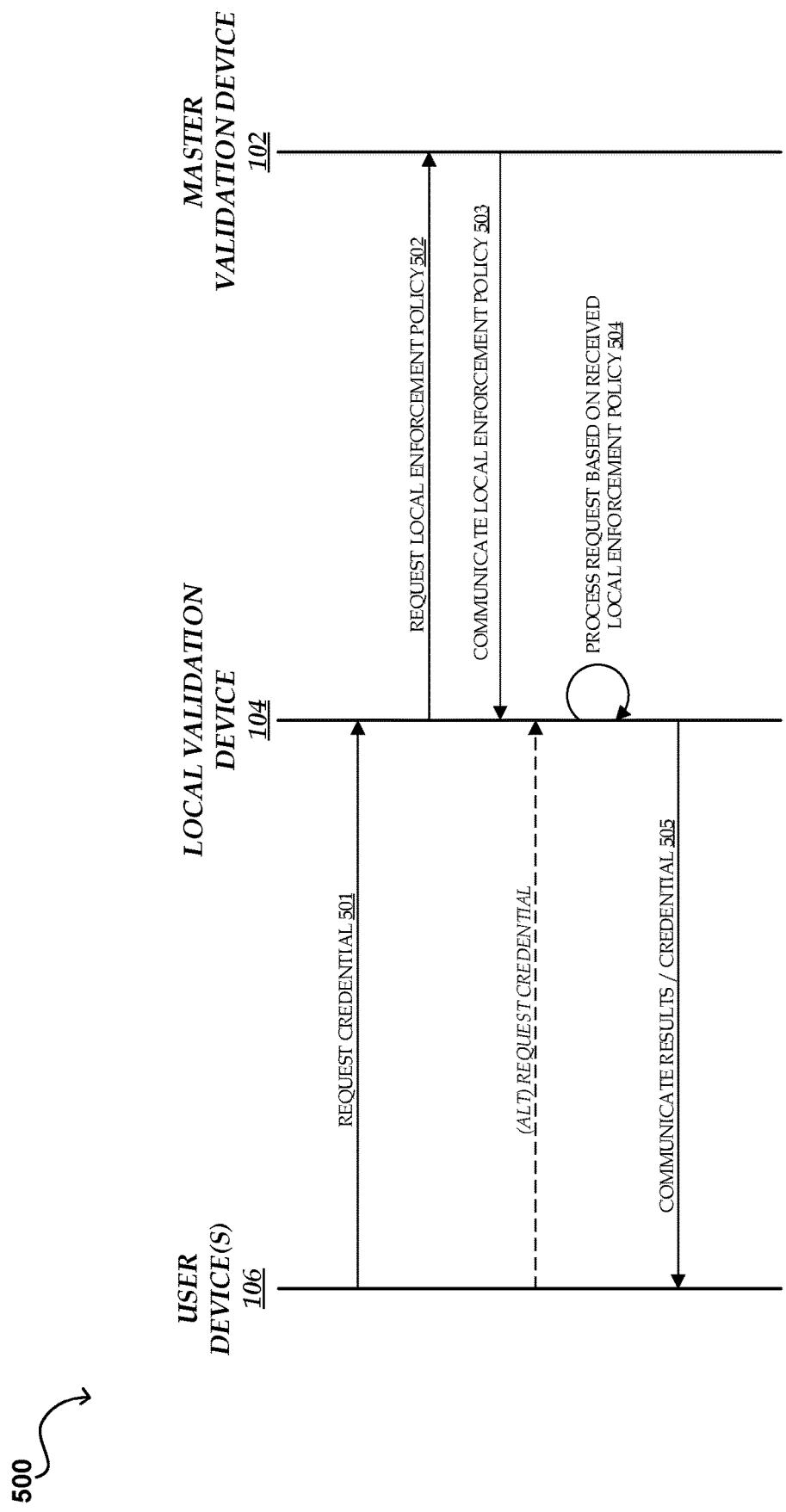
FIG. 5 is a data flow diagram illustrative of an embodiment for distributing credentials using a local validation device.

FIG. 5 is a data flow diagram illustrative of an embodiment for distributing credentials using a local validation device. Although FIG. 5 only shows interactions between the MVD 102, LVD 104, and user devices 106, it will be understood that the environment 500 can include fewer or more components as desired and/or be configured differently. For example, additional communications can occur between the devices 102, 104, 106, and/or additional components can be used to communicate the data between the illustrated devices 102, 104, 106. In some cases, the embodiment illustrated in FIG. 5 can correspond to a scenario in which the local validation device 104 has already received credentials from the master validation device 102 that are to be distributed to user devices 106.

At 501 the user devices 106 communicates with the LVD 104. As part of the communication, the user devices 106 sends a credential request to the LVD 104. In some cases, the request can be in the form of an identifier communicated to the LVD 104, similar to event 201 of FIG. 2, or can be a specific request for a particular credential that may or may not include an identifier. In certain embodiments, the user device 106 can authenticate itself with the LVD 104 and/or provide an identifier that the LVD 104 will use to process the request.

At 502, the LVD 104 communicates with the MVD 102. As part of the communication, the LVD 104 can request a local enforcement policy from the MVD 102. In some cases, the requested local enforcement policy can be based on the credential requested by the user device 106. For example, different policies can be used for different credentials. As such, the LVD 104 can request the local enforcement policy that corresponds to the credential requested by the user device 106. In some cases, the LVD's 104 request for local enforcement policy can include, among other things, device identifiers corresponding to user devices 106 or LVD 104.

At 503, the MVD 102 communicates the local enforcement policy to the LVD 104. The local enforcement policy can include requirements that are similar to the requirements used by the MVD 102 to validate user devices 106, as described previously. In some cases, the local enforcement policy can include different requirements. For example, the local enforcement policy may indicate that the LVD 104 can only perform a validation, or process requests, when it is unable to access the MVD 102, that the LVD 104 can only request or distribute a certain number of credentials, that the user devices 106 requesting the validations must have an IP address, MAC address, or other identifier within a particular range, etc. In some embodiments, the MVD 102 can communicate the local enforcement policy to the LVD 104 without receiving a request from the LVD 104.

At 504, the LVD 104 processes the request based on the received local enforcement policy. In some cases, the LVD 104 can process the request similar to the way in which the MVD 102 would validate the user device 106. For example, the LVD 104 can perform a pre-validation of credential requests received from the user devices 106 based on the received local enforcement policy. In some cases, the LVD 104 follows and/or uses the local enforcement policy received from the MVD 102 to perform the validations (e.g., verify the identity of a user device 106). For example, the LVD 104 can compare an identifier received from a user device 106 with the local enforcement policy to verify that the identifier is a valid identifier. At 505, similar to event 206 of FIG. 2, the LVD 104 communicates credentials and/or the results of the processing to each of the user devices 106. For example, if the LVD 104 determines that a user device 106 is to receive a credential, it can communicate the credential to the user device. Alternatively, if the LVD 104 determines that a user device 106 is not to receive a credential, it can communicate the result to the user device. In some cases, if the user device 106 did not provide sufficient information or the correct information, the LVD 104 can identify the information that needs to be corrected to the user device 106. In response, the user device 106 can update the credential request and resend it to the LVD 104.

Depending on the embodiment, certain acts, events, blocks, communications or functions identified above can be performed in a different sequence, can be added, merged, or left out altogether (non-limiting example: not all described operations or events are necessary). In some cases, event 501 may additionally or alternatively occur after or concurrently with either of events 502 or 503. For example, the LVD 104 can have stored thereon one or more local enforcement policies received from the MVD 102. When the LVD 104 receives a credential request from a user device 106, the LVD 104 can identify the local enforcement policy to use based on the credential requested (or based on the identity of the user device 106 requesting the credential). In addition, in some cases, any one or any combination of events 501, 502, 503, 504, or 505 can be omitted. Moreover, in certain embodiments, operations or events can be performed concurrently. For example, the LVD 104 can concurrently receive a credential request and request a local enforcement policy. Furthermore, any one or any combination of the activities described above can occur automatically and/or without user input.

Processing Validation Requests

Figure 6:
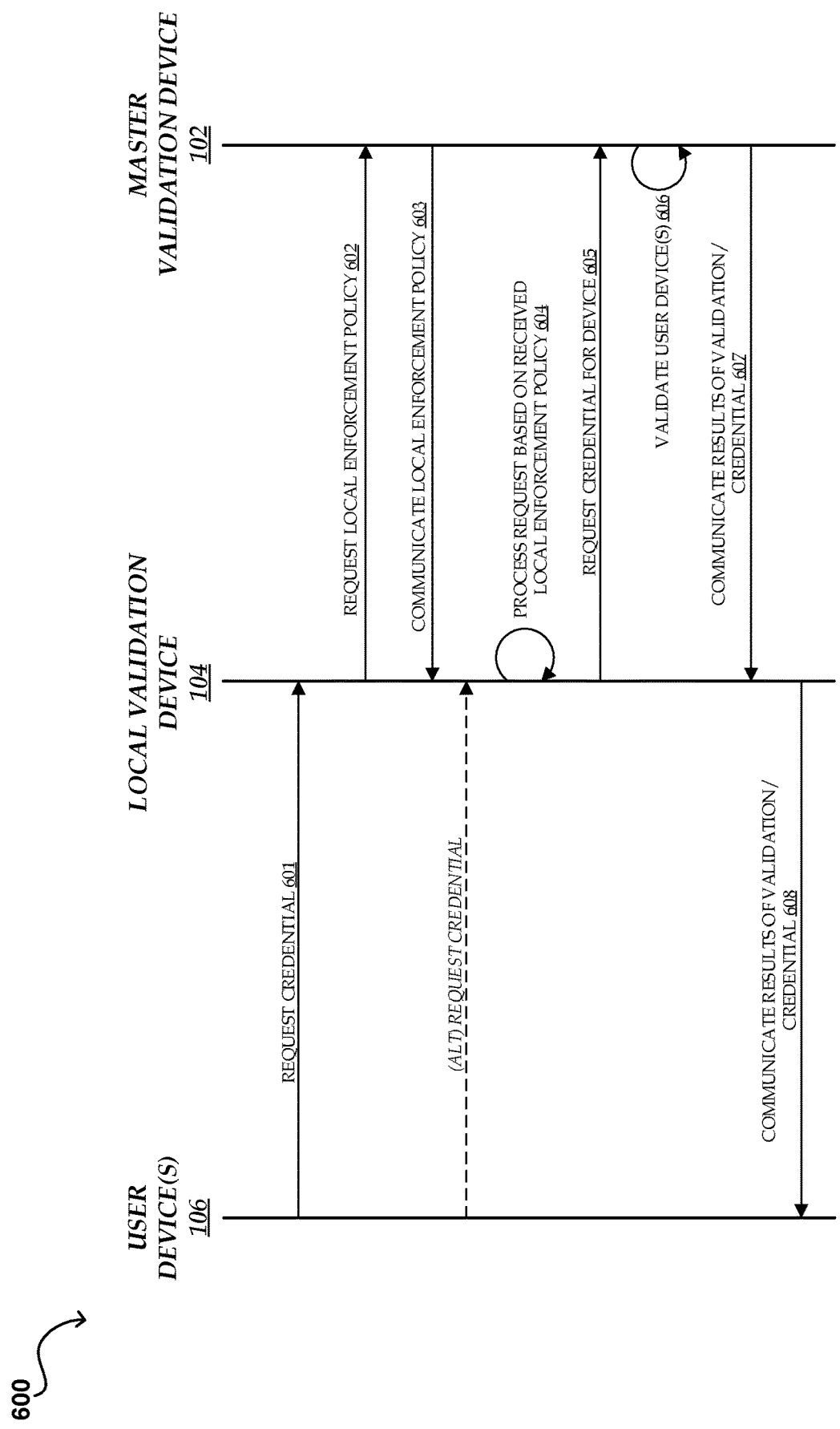
FIG. 6 is a data flow diagram illustrative of an embodiment of processing validation requests at a local validation device.

FIG. 6 is a data flow diagram illustrative of an embodiment of processing validation requests at a local validation device. Although FIG. 6 only shows interactions between the MVD 102, LVD 104, and user devices 106, it will be understood that the environment 600 can include fewer or more components as desired and/or be configured differently. For example, additional communications can occur between the devices 102, 104, 106, and/or additional components can be used to communicate the data between the illustrated devices 102, 104, 106.

At 601, similar to event 501 of FIG. 5, each of the user devices 106 communicates with the LVD 104 to request a credential. At 602, similar to event 502 of FIG. 5, the LVD 104 communicates with the MVD 102 to request a local enforcement policy from the MVD 102. At 603, similar to event 503 of FIG. 5, the MVD 102 communicates a local enforcement policy to the LVD 104.

At 604, the LVD 104 processes the requests of the user devices 106 based at least in part on the received local enforcement policy, similar to event 504 of FIG. 5. In some embodiments, the LVD 104 can provide user device 106 feedback regarding the credential request. For example, if the user device 106 does not properly identify itself or provide proper information for authentication, the LVD 104 can instruct the user device 106 that its request would be rejected by the MVD 102 if submitted. Accordingly, the user device 106 can use the feedback from the LVD 104 to update and resend the credential request. At 605, similar to event 203 of FIG. 2, the LVD 104 requests a credential from the MVD 102. In some cases, the credential request can include an indication of the results of the process performed by the LVD 104 at event 604.

At 606, similar to event 204 of FIG. 2, the MVD 102 performs a validation for the credential request. In certain embodiments, based on the results of the processing by the LVD 104, the MVD 102 can validate the user device 106 more quickly. For example, if the processing done by the LVD 104 is similar to a validation typically performed by the MVD 102, the MVD 102 can perform a shorter validation or issue the credential based on LVD 104's indication that the user device 106 should be validated.

At 607, similar to event 205 of FIG. 2, the MVD 102 communicates results of each validation and/or communicates credentials to the LVD 104. At 608, similar to event 206 of FIG. 2, the LVD 104 communicates credentials to each of the user devices 106.

Depending on the embodiment, certain acts, events, blocks, communications or functions identified above can be performed in a different sequence, can be added, merged, or left out altogether (non-limiting example: not all described operations or events are necessary). For example, event 601 may additionally or alternatively occur after or concurrently with either of events 602 or 603. In addition, in some cases, any one or any combination of events 601, 602, 603, 604, 605, 606, 607, or 608 can be omitted. For example, in some cases, rather than requesting and receiving a local enforcement policy, the LVD 104 can instruct the MVD 102 which local enforcement policy should or will be used to validate a user device 106. Moreover, in certain embodiments, operations or events can be performed concurrently. Furthermore, any one or any combination of the activities described above can occur automatically and/or without user input.

Local Validation Device and Policy Validation

Figure 7:
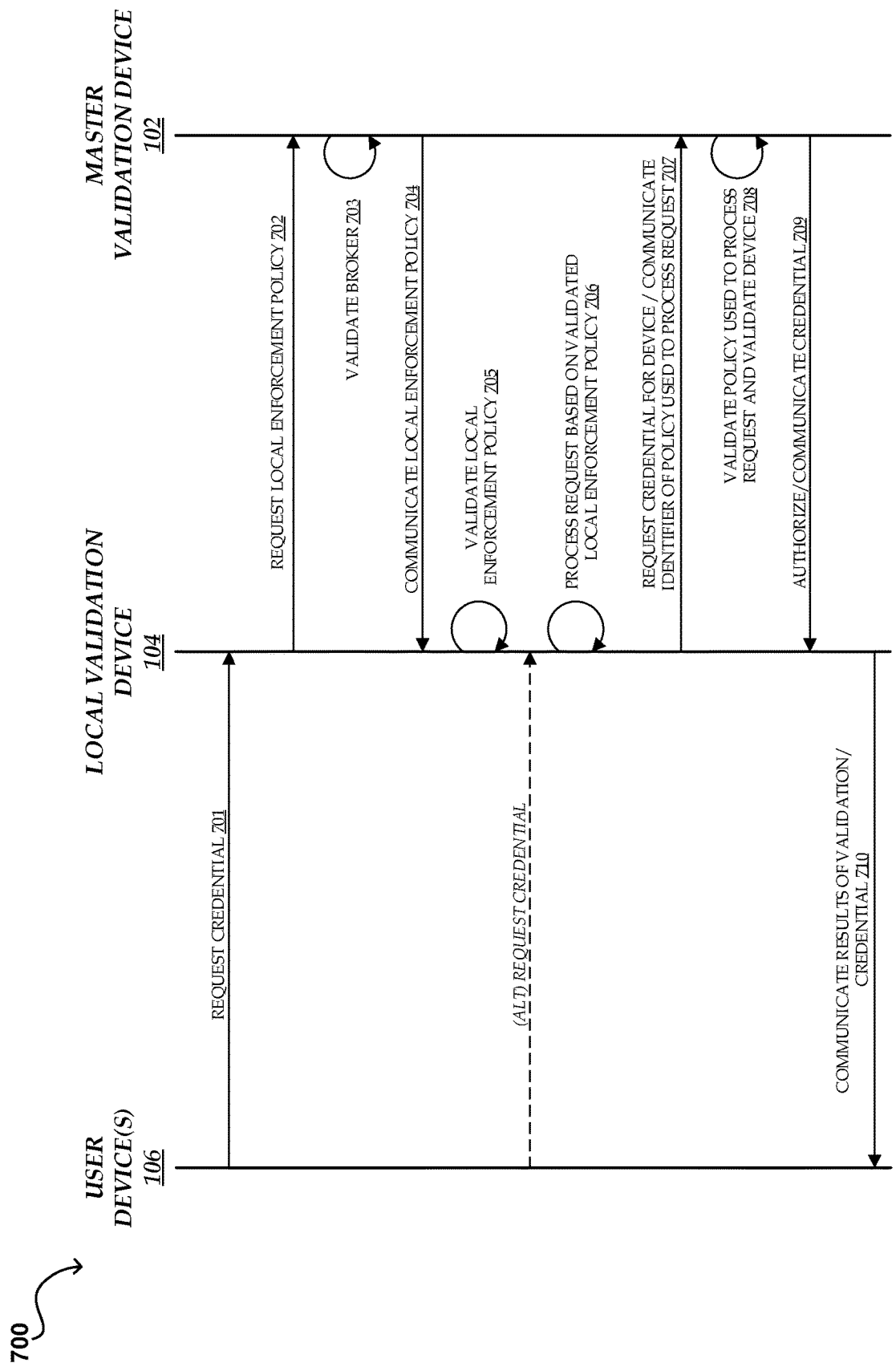
FIG. 7 is a data flow diagram illustrative of an embodiment of validating a local validation device as part of validating a user device.

FIG. 7 is a data flow diagram illustrative of an embodiment of validating a LVD and a local enforcement policy, as part of validating a user device. Although FIG. 7 only shows interactions between the MVD 102, LVD 104, and user devices 106, it will be understood that the environment 700 can include fewer or more components as desired and/or be configured differently. For example, additional communications can occur between the devices 102, 104, 106, and/or additional components can be used to communicate the data between the illustrated devices 102, 104, 106.

At 701, similar to event 501 of FIG. 5, each of the user devices 106 communicates with the LVD 104 to request a credential. At 702, similar to event 502 of FIG. 5, the LVD 104 communicates with the MVD 102 to request a local enforcement policy from the MVD 102. In some cases, the LVD 104 can generate a keycode and include it in the request for the local enforcement policy, or share a secret with the MVD 102.

At 703, the MVD 102 can authenticate the LVD 104. In response to receiving the request for a local enforcement policy, the MVD 102 can validate the LVD 104. That is, the MVD 102 can verify, among other things, that the LVD 104 is authorized to (i) request a local enforcement policy from the MVD 102; (ii) receive credential requests from the user devices 106; (iii) request results of validation and/or credentials from the MVD 102, (iv) receive results of validation and/or credentials from the MVD 102, or (iv) perform validations or pre-validation of credential requests.

In some cases, the MVD 102 requests, or the LVD 104 provides, information corresponding to the LVD 104 which the MVD 102 can use to validate (e.g., approve or deny) the LVD 104. The information provided by the LVD 104 to the MVD 102 can include but is not limited to, a digital signature, a public key, an LVD identifier, a password, credential, device certificate, or other identifier that the MVD 102 can use to verify the LVD 104. In some cases, the MVD 102 can authenticate the LVD 104 prior to verifying an identity of the user devices 106. Thus, for example, if the MVD 102 determines that the LVD 104 is not authorized, the MVD 102 can ignore credential requests received from the LVD 104. However, in some cases, the MVD 102 can perform validation on one or more of the credential requests despite determining that the LVD 104 is not authorized to perform one or more of the foregoing functions.

In some instances, such as when the MVD 102 determines that the LVD 104 is authorized, the MVD 102 can create or provide the LVD 104 with relevant credentials for itself, similar to credential provided to user devices 106. The credentials can include, but are not limited to, any one or any combination of a username, a password, a password-derived key, an Internet key exchange (IKE) key, signed data, a token, an authorization factor, a signed or other credential, information identifying the MVD 102, and the like. In some embodiments, the MVD 102 will not provide credentials to the LVD 104 if the LVD 104 has not been authenticated.

At 704, similar to event 503 of FIG. 5, the MVD 102 communicates a local enforcement policy to the LVD 104. At 705, the LVD 104 validates the received local enforcement policy. In some cases, to validate the local enforcement policy, the LVD 104 can determine whether the local enforcement policy is signed by the MVD 102. For example, each time the MVD 102 communicates a local enforcement policy to the LVD 104, it can sign the local enforcement policy. Based on the signature, the LVD 104 can determine whether the received local enforcement policy came from the MVD 102, or another entity. In certain embodiments, the LVD 104 can validate the local enforcement policy by comparing a hash of the received local enforcement policy with a stored hash that corresponds to the local enforcement policy that is to be used. In some embodiments, the MVD 102 can encrypt the local enforcement policy, and the LVD 104 can validate the local enforcement policy be decrypting it using a corresponding decryption key. In certain embodiments, such as when the LVD 104 includes a keycode in the request for a local enforcement policy, the MVD 102 can embed the keycode in the response that it communicates to the LVD 104. The LVD 104 can validate the local enforcement policy by locating the keycode within the response and determining that the received keycode is the same keycode that the LVD 104 previously provided to the MVD 102.

At 706, similar to event 604 of FIG. 6, the LVD 104 processes the requests of the user devices 106 based at least in part on the local enforcement policy. At 707, similar to event 605 of FIG. 6, the LVD 104 requests a credential from the MVD 102. In addition or alternatively, the LVD 104 can communicate an identifier of the local enforcement policy used by the LVD 104 to process the credential request.

At 708, the MVD 102 can validate the local enforcement policy that was used by the LVD 104 to process the request. The MVD 102 can validate the local enforcement policy used by the LVD 104 similar to the way in which the LVD 104 validated the local enforcement policy received from the MVD 102. For example, the MVD 102 can compare the hash of the (signed or unsigned) local enforcement policy at the LVD 104 with a hash of the (signed or unsigned) correct local enforcement policy stored on the MVD 102. If the hashes match then the MVD 102 can determine that the LVD 104 used the correct local enforcement policy and validate the local enforcement policy. In some embodiments, the MVD 102 can validate the local enforcement policy by decrypting an encrypted version of the local enforcement policy received by the LVD 104, performing a cryptographic check on the local enforcement policy, etc. Once the local enforcement policy is validated, the MVD 102 can validate the user device, as described in greater detail above with reference to event 204 of FIG. 2.

At 709, similar to event 205 of FIG. 2, the MVD 102 can communicate results of each validation and/or credentials to the LVD 104. In addition or alternatively, the MVD 102 can authorize the LVD 104 to communicate credentials created by the LVD 104. In some cases, the MVD 102 may authorize and/or communicate a credential only if the appropriate local enforcement policy was used by the LVD 104. However, it should be noted that in some instances, the MVD 102 may authorize and/or communicate a credential even if the appropriate local enforcement policy was not used by the LVD 104.

At 710, similar to event 206 of FIG. 2, the LVD 104 communicates results of a validation (e.g., validation performed by the LVD 104, validation performs by the MVD 102) and/or communicates credentials (e.g., credentials generated by the LVD 104, credentials generated by the MVD 102) to the user devices 106. In addition or alternatively, the LVD 104 can communicate an identifier of the local enforcement policy.

Depending on the embodiment, certain acts, events, blocks, communications or functions identified above can be performed in a different sequence, can be added, merged, or left out altogether (non-limiting example: not all described operations or events are necessary). For example, event 701 may additionally or alternatively occur after or concurrently with any of events 702, 703, 704, or 705. In addition, in some cases, any one or any combination of events 701, 702, 703, 704, 705, 706, 707, or 708 can be omitted. Moreover, in certain embodiments, operations or events can be performed concurrently. Furthermore, any one or any combination of the activities described above can occur automatically and/or without user input.

Figure 8:
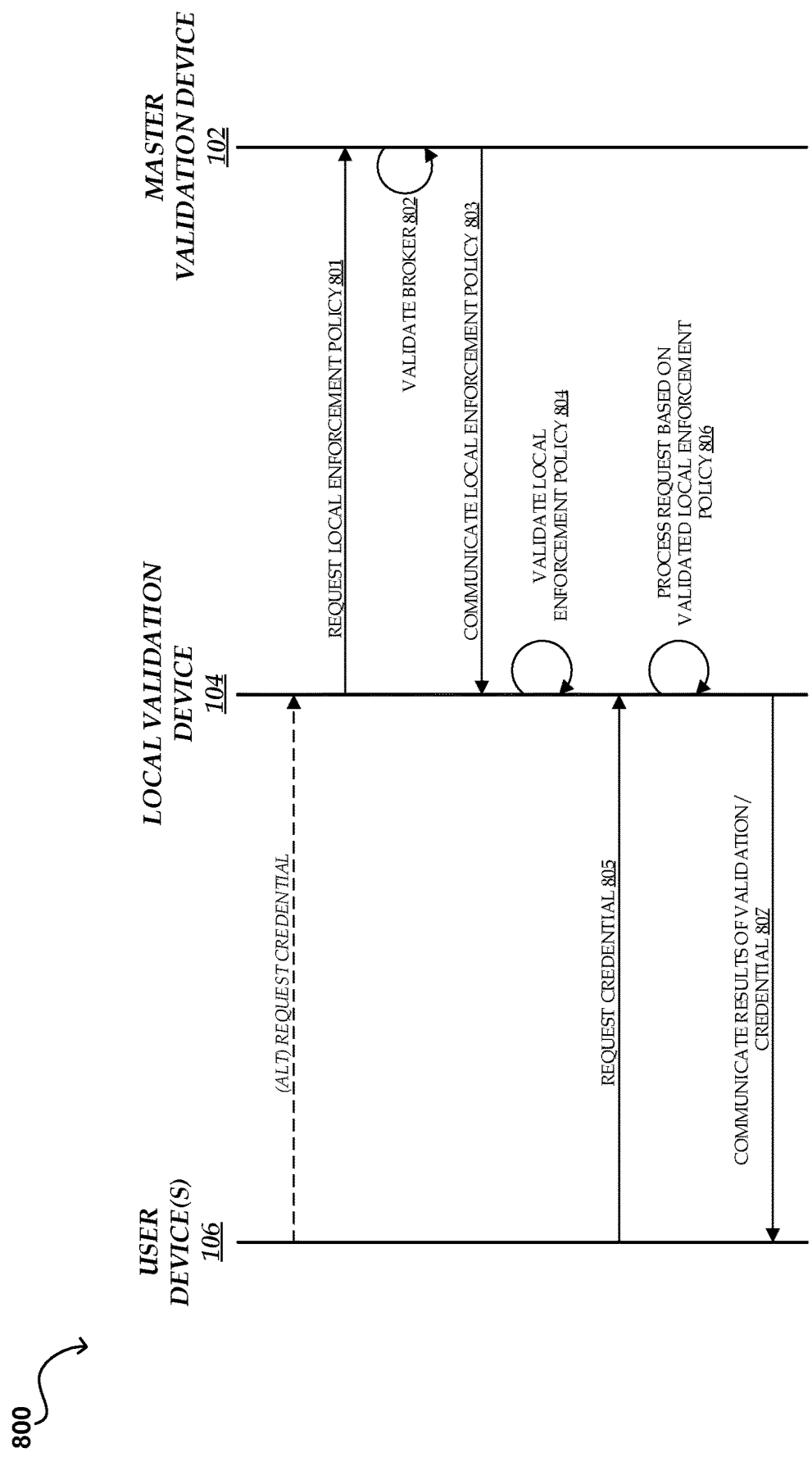
FIG. 8 is a data flow diagram illustrative of an embodiment of validating a local validation device as part of validating a user device.

FIG. 8 is a data flow diagram illustrative of an embodiment of validating a local validation device as part of validating a user device. Although FIG. 8 only shows interactions between the MVD 102, LVD 104, and user devices 106, it will be understood that the environment 800 can include fewer or more components as desired and/or be configured differently. For example, additional communications can occur between the devices 102, 104, 106, and/or additional components can be used to communicate the data between the illustrated devices 102, 104, 106. In some cases, the embodiment illustrated in FIG. 8 can correspond to a scenario in which the local validation device 104 has already received credentials from the master validation device 102 that are to be distributed to user devices 106.

At 801, similar to event 502 of FIG. 5, the LVD 104 can request a local enforcement policy from the MVD 102. At 802, similar to event 703 of FIG. 7, the MVD 102 can validate the LVD 104. At 803, similar to event 503 of FIG. 5, the MVD 102 can communicate the local enforcement policy to the LVD 104. At 804, similar to event 705 of FIG. 7, the LVD 104 can validate the local enforcement policy. At 805, similar to event 501 of FIG. 5, the user device 106 can communicate a credential request to the LVD 104.

At 806, similar to event 504 of FIG. 5, the LVD 104 can process the request. At 807, similar to event 505 if FIG. 5, the LVD 104 can communicate the results of the processing or a credential, and/or an identifier of the local enforcement policy to the user devices 106.

Depending on the embodiment, certain acts, events, blocks, communications or functions identified above can be performed in a different sequence, can be added, merged, or left out altogether (non-limiting example: not all described operations or events are necessary). For example, event 805 may additionally or alternatively occur prior to or concurrently with any of events 801, 802, 803, or 804. In addition, in some cases, any one or any combination of events 801, 802, 803, 804, 805, 806, 807, 808, 809, or 810 can be omitted. Moreover, in certain embodiments, operations or events can be performed concurrently. Furthermore, any one or any combination of the activities described above can occur automatically and/or without user input.

Bundling of Information for Certificate Requests

Figure 9:
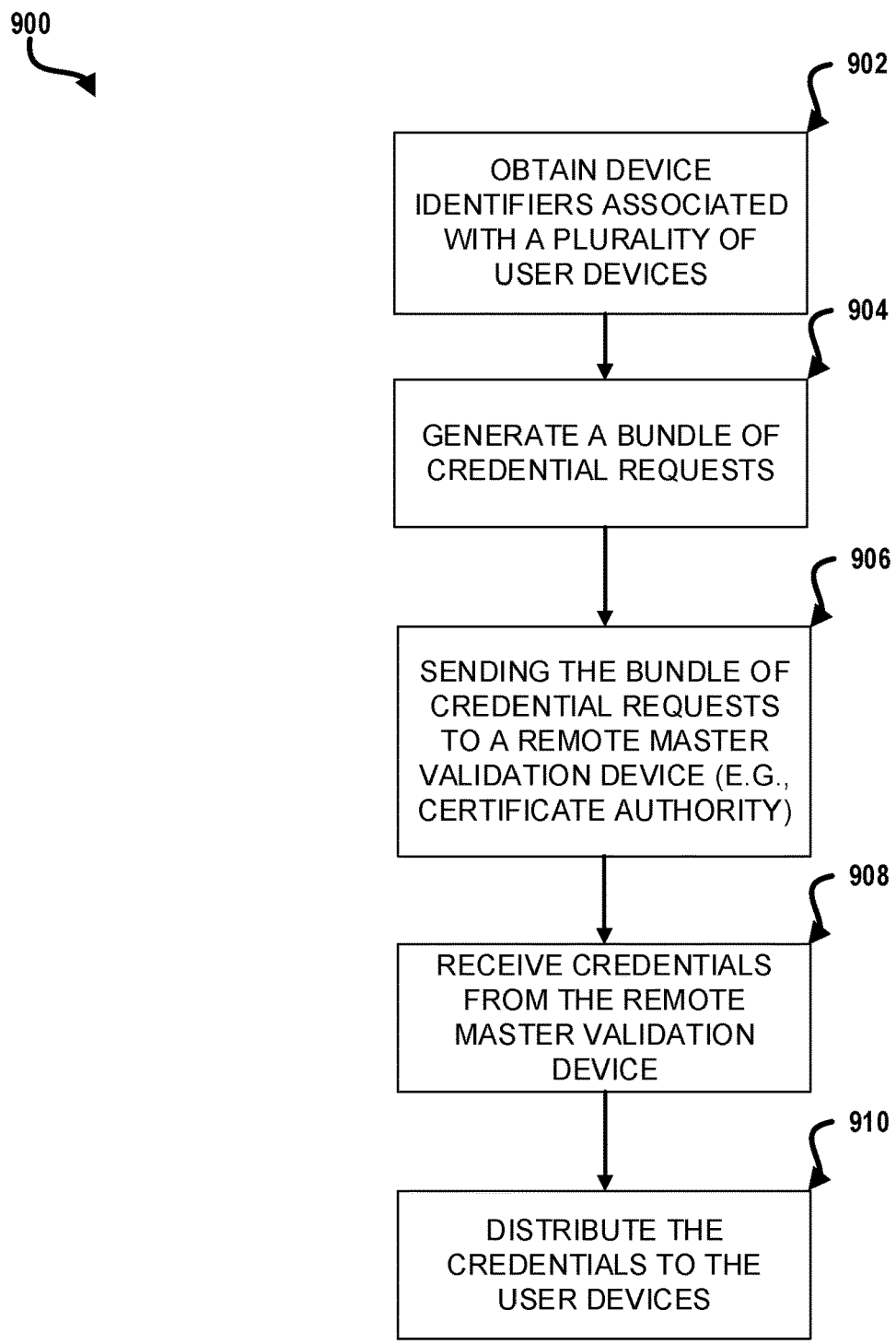
FIG. 9 is a flow diagram illustrative of an embodiment of bundling information for credential requests.

FIG. 9 is a flow diagram of an embodiment of a routine 900 executed by a local validation device (e.g., LVD 104) to bundle information for credential requests using identifiers received from user devices 106 or generated by the LVD. The blocks illustrated in FIG. 9 are provided for illustrative purposes only. It will be understood that one or more of the blocks illustrated in FIG. 9 may be removed or that the ordering of the blocks may be changed. Furthermore, for the purposes of illustrating a clear example, one or more particular system components are described in the context of performing various operations during each of the data flow stages. However, other system arrangements and distributions of the processing steps across system components may be used.

At block 902, the local validation device 104 obtains device identifiers associated with a plurality of the user devices 106. The device identifiers can provide an indication of an identity of the user devices 106 (such as a unique identifier), an indication of an identity of a customer or user, or other indication. For example, the one or more identifiers can include any one or any combination of a MAC address, processor ID, domain name, device name, random string, unique identifier, or customer assigned identifier, and the like. In some embodiments, the user devices 106 provide the LVD 104 with the plurality of device identifiers. In certain embodiments, the LVD 104 generates the plurality of device identifiers. The device identifiers can be any type of identifier and can be sequentially or randomly generated by the LVD 104. The identifiers can provide an indication of an identity of a device (such as a unique identifier), an indication of an identity of a customer or user, or other indication. In some embodiments, block 902 may involve receiving credential requests from the user devices 106 and/or generating credential requests at the LVD 104.

At block 904, the local validation device 104 generates a bundle of credential requests based on the device identifiers obtained at block 902. In some embodiments, the LVD 104 may also store (e.g., locally or remotely) the bundled credential requests in memory, until such time as the LVD 104 is ready or able to communicate with the MVD 102. In some embodiments, block 904 may involve bundling together credential requests received from the user devices 106 or generated at the LVD 104.

At block 906, LVD 104 sends the bundle of credential requests for the user devices to a master validation device (e.g., MVD 102), which, in some embodiments, can be a certificate authority. In some instances, the LVD 104 can simultaneously send multiple credential requests for multiple credentials to the MVD 102 for validation, rather than sending a different request for each credential. The MVD 102 may, in some embodiments, be located at a remote site apart from the LVD 104 and the user devices. For example, the MVD 102 may, in certain instances, only be accessible to the LVD 104 via a wide area network, such as the Internet, whereas, the LVD 104 and user devices 106 may be accessible to each other via a local area network.

In some embodiments, the MVD 102 can perform a validation of the user devices 106 based on the bundle of credential requests received from the LVD 104. In certain embodiments, the MVD 102 generates a credential for the user devices based on the outcome of the validation. For example, if the MVD 102 is able to validate a user device, it generates a credential for the user device. If the user device cannot be validated, the MVD 102 may not generate a credential for the user device.

At block 908, LVD 104 receives credentials for the users devices from the master validation device (e.g., MVD 102). In some cases, the MVD 102 may only provide credentials that have passed a validation process, such as verifying the identities of the user devices 106 or the LVD 104. To reduce communications between the MVD 102 and the LVD 104 and in some cases due to the intermittent nature of communications between the MVD 102 and LVD 104, the MVD 102 can, in certain instances, generate a provisional credential for a user device that it could not validate. The MVD 102 can communicate the provisional credential to the LVD 104 with an indication that the user device 106 is not to receive the credential unless/until it can validate itself to the LVD 104 in a manner determined by the MVD 102. In this way, the LVD 104 can obtain and distribute credentials to user devices 106 without having to wait for another communication with the MVD 102. For example, if the credential request for the user device 106 was missing a certain identifier for the user device 106, the MVD 102 can indicate that once the identifier is provided to the LVD 104, the provisional credential can be distributed to the user device 106. However, in some cases, if the MVD 102 cannot validate the user device 106, then it does not generate a credential for the user device 106. As described herein, in certain embodiments, the LVD 104 can use a local enforcement policy to pre-validate the user device 106 or credential request to reduce the likelihood that the user device 106 will not be validated by the MVD 102. The local enforcement policy can use requirements to pre-validate the user device that are similar to the requirements used to validate the user device 106 by the MVD 102.

At block 910, LVD 104 communicates with the user devices 106 and distributes the credentials to the user devices 106. For example, the LVD 104 can communicate the results of each validation and/or the credentials to the user devices 106. In some embodiments, the LVD 104 communicates the results to fewer than all of the user devices 106. For instance, the LVD 104 may only communicate with user devices 106 which have been validated (e.g., a user device 106 for which a credential has been issued). In some embodiments, the LVD 104 can communicate the results/credentials to a single device or a few devices, and those devices can distribute the results to one or more other user devices 106.

Depending on the embodiment, certain acts, events, blocks, communications or functions identified above can be performed in a different sequence, can be added, merged, or left out altogether (non-limiting example: not all described operations or events are necessary). In some cases, any one or any combination of blocks 902, 904, 906, 908, or 910 can be omitted. For example, in some embodiments, the MVD 104 can generate identifiers and credentials for the user devices 106. In such embodiments, the contents of any one or any combination of blocks 902, 904, and 906 can be replaced with the LVD 104 requesting the pre-generated identifiers and credentials from the MVD 102. Moreover, in certain embodiments, operations or events can be performed concurrently. For example, the LVD 104 can concurrently generate an identifier for the user devices 106 and bundle information for credential requests. Furthermore, any one or any combination of the activities described above can occur automatically and/or without user input.

As a non-limiting example, in some cases, the LVD 104 can generate and provide the user devices 106 with a limited credential before, after, or concurrently with blocks 902, 904 and/or 906 described above. As described herein, in some cases, the limited credentials may be signed by the LVD 104, but may not be signed by the MVD 102 or a certificate authority. Accordingly, in some embodiments, the limited credential may authenticate the LVD 104 with a limited number of devices or within a limited number of networks (while credentials from the MVD 102 can authenticate the user device 106 with a larger number of devices or networks, such as the Internet). In certain embodiments, the limited credentials may be used by the user devices 106 in communicating with other devices for a limited time period and/or until the user devices 106 receives longer-term or more widely accepted credentials associated with the MVD 102. Furthermore, as part of distributing the credentials from the MVD 102 to the user devices 106 described above with reference to block 910, the LVD 104 can remove or replace the limited credentials with the credentials received from the MVD 102.

Generating and Distributing Credentials Using a Local Validation Device

Figure 10:
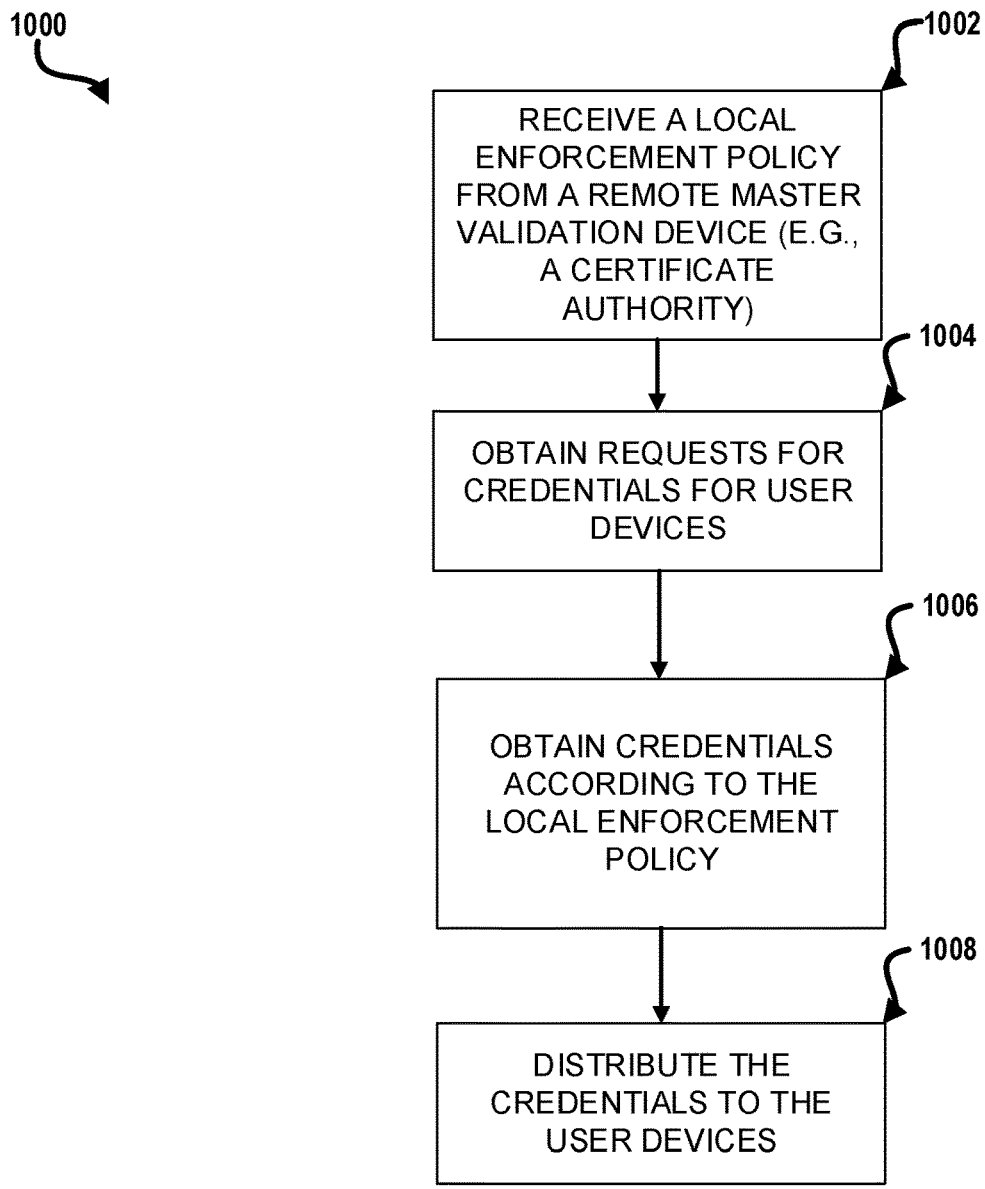
FIG. 10 is a flow diagram illustrative of an embodiment of generating and distributing credentials using a local validation device.

FIG. 10 is a flow diagram illustrating an embodiment of a routine 1000 that can be executed by a local validation device (e.g., LVD 104) to obtain and/or distribute credentials to user devices 106 in accordance with a local validation policy. The blocks illustrated in FIG. 10 are provided for illustrative purposes only. It will be understood that one or more of the blocks illustrated in FIG. 10 may be removed or that the ordering of the blocks may be changed. Furthermore, for the purposes of illustrating a clear example, one or more particular system components are described in the context of performing various operations associated with each block. However, other system arrangements and distributions of the operations across system components may be used.

At block 1002, the local validation device 104 communicates with the MVD 102. In some embodiments, as part of communicating with the MVD 102, the LVD 104 can receive a local enforcement. In certain embodiments, as part of the communication, the MVD 102 may validate the LVD 104 (e.g., as described in connection with 703 of FIG. 7) or vice versa. As an example, the MVD 102 may verify that the LVD 104 is authorized to receive and implement a local enforcement policy. Additionally or alternatively, the LVD 104 may validate the MVD 102 and/or the local enforcement policy (e.g., as described in connection with 705 of FIG. 7). As an example, the LVD 104 may validate the local enforcement policy by confirming that the local enforcement policy is signed by the MVD 102.

In some cases, the local enforcement policy can be based on the credential requested by the user device 106. For example, different policies can be used for different credentials. As such, the LVD 104 can receive the local enforcement policy that corresponds to the credential requested by the user device 106. In some cases, the local enforcement policy can include, among other things, device identifiers corresponding to user devices 106 or LVD 104. In at least some embodiments, the local enforcement policy may assign limited authority to the LVD 104 to independently generate and distribute credentials (such authority being constrained by any relevant aspects of the local enforcement policy). The local enforcement policy can include requirements that are similar to the requirements used by the MVD 102 to validate user devices 106, as described previously. In some cases, the local enforcement policy can include different requirements. For example, the local enforcement policy may indicate that the LVD 104 can only perform a validation, or process requests, when it is unable to access the MVD 102, that the LVD 104 can only request or distribute a certain number of credentials, that the user devices 106 requesting the validations must have an IP address, MAC address, or other identifier within a particular range, etc. In some embodiments, the MVD 102 can communicate the local enforcement policy to the LVD 104 without receiving a request from the LVD 104.

At block 1004, the LVD 104 receives requests for credentials from user devices 106 or generates requests for credentials on behalf of the user devices 106. In some embodiments, the user devices 106 may be devices that are in the process of being manufactured or of being added to a local network and may be co-located with the LVD 104 at a manufacturing facility (while the MVD 102 may be remotely located). In some embodiments, block 1004 may involve receiving the requests for credentials in the form of device identifiers from the user devices 106. In certain embodiments, the LVD 104 may itself generate requests for credentials and/or generate device identifiers on behalf of the user devices 106. For example, the LVD 104 can receive an instruction from a user or the MVD 102 to generate identifiers and/or credential requests for a particular number of unidentified user devices 106.

At block 1006, the LVD 104 processes the credential requests based on the local enforcement policy and obtains credentials in accordance with the local enforcement policy. For example, the LVD 104 can perform a validation or a pre-validation of credential requests received from the user devices 106 based on the received local enforcement policy. In certain embodiments, such as when the LVD 104 receives credentials from the MVD 102 before receiving or processing requests for credentials, the LVD 104 can perform a validation of the user device and, if validated, retrieve a credential that it previously received from the MVD 102. In some embodiments, the LVD 104 performs a pre-validation of credential requests received from the user devices 106 based on the local enforcement policy and then, when a connection with the MVD 102 is available (or at some other appropriate time), the pre-validated credential requests are sent to the MVD 102. In such embodiments, the MVD 102 performs its own validation of the credential requests, which may take into account the pre-validation performed by the LVD 104, and generates and returns the associated credentials to the LVD 104. In some cases, the LVD 104 follows and/or uses the local enforcement policy received from the MVD 102 to perform the validations or pre-validations (e.g., verify the identity of a user device 106). For example, the LVD 104 can compare an identifier received from a user device 106 with the local enforcement policy to verify that the identifier is a valid identifier.

At block 1008, the LVD 104 communicates with the user devices 106 and distributes the credentials to the user devices 106. For example, the LVD 104 can communicate the results of each validation and/or the credentials to the user devices 106. In some embodiments, the LVD 104 communicates the results to fewer than all of the user devices 106. For instance, the LVD 104 may only communicate with user devices 106 which have been validated (e.g., a user device 106 for which a credential has been issued). In some embodiments, the LVD 104 can communicate the results/credentials to a single device or a few devices, and those devices can distribute the results to one or more other user devices 106.

Depending on the embodiment, certain acts, events, blocks, communications or functions identified above can be performed in a different sequence, can be added, merged, or left out altogether (non-limiting example: not all described operations or events are necessary). In some cases, block 1004 may additionally or alternatively occur after or concurrently with block 1002. For example, the LVD 104 can have stored thereon one or more local enforcement policies received from the MVD 102. When the LVD 104 receives a credential request from a user device 106, the LVD 104 can identify the local enforcement policy to use based on the credential requested (or based on the identity of the user device 106 requesting the credential). In addition, in some cases, any one or any combination of blocks 1002, 1004, 1006, or 1008 can be omitted. Moreover, in certain embodiments, operations or events can be performed concurrently. For example, the LVD 104 can concurrently receive a credential request and request a local enforcement policy. Furthermore, any one or any combination of the activities described above can occur automatically and/or without user input.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method, comprising:
   generating, at a local validation device, a bundle of a plurality of credential requests for a plurality of user devices;
   detecting, at the local validation device, a condition;
   based on the detection of the condition, sending the bundle of the plurality of credential requests for the plurality of user devices to a master, remote validation device over a network;
   receiving, at the local validation device, a plurality of credentials for the plurality of user devices from the master, remote validation device over the network; and
   distributing, from the local validation device, each of the credentials to its respective user device.

2. The method of claim 1, wherein each of the credential requests includes a respective device identifier, each device identifier associated with a respective one of the plurality of user devices.

3. The method of claim 1, wherein each of the credential requests includes a respective device identifier and additional information, each device identifier associated with a respective one of the plurality of user devices.

4. The method of claim 1, wherein each of the credential requests includes a respective device identifier and additional information including at least one of a policy identifier, an entity identifier, a legal identity identifier, key usage information, extended key usage information, certificate revocation list information, an identity of an issuing master remote validation device, a credential validity period, or an identification of a signing, encryption, or hashing algorithm, each device identifier associated with a respective one of the plurality of user devices.

5. The method of claim 1, wherein the condition comprises an availability of a connection over the network between the local validation device and the master, remote validation device.

6. The method of claim 1, wherein detecting the condition comprises monitoring, with the local validation device, availability of a connection over the network between the local validation device and the master, remote validation device.

7. The method of claim 1, wherein the condition comprises an expiration of a time interval.

8. The method of claim 1, the method further comprising, obtaining a plurality of device identifiers, wherein obtaining the plurality of device identifiers comprises:
   receiving, at the local validation device, the device identifiers from the plurality of user devices.

9. The method of claim 1, the method further comprising, obtaining a plurality of device identifiers, wherein obtaining the plurality of device identifiers comprises:
   receiving, at the local validation device, a credential request from each of the user devices.

10. The method of claim 1, the method further comprising, obtaining a plurality of device identifiers, wherein obtaining the plurality of device identifiers comprises:
    receiving, at the local validation device, a credential request from each of the user devices, wherein each credential request includes one of the device identifiers.

11. The method of claim 1, the method further comprising, obtaining a plurality of device identifiers, wherein obtaining the plurality of device identifiers comprises generating, at the local validation device, the plurality of device identifiers.

12. The method of claim 1, the method further comprising, obtaining a plurality of device identifiers, wherein the user devices comprise user devices being manufactured and wherein obtaining the plurality of device identifiers comprises generating, at the local validation device, the plurality of device identifiers based on a number of the user devices expected to be manufactured within a future time period.

13. Non-transitory computer-readable media including computer-executable instructions that, when executed by a computing system, cause the computing system to:
    detect, at a local validation device, a condition;
    based on detection of the condition, send, from the local validation device, a request for a plurality of credentials for a plurality of user devices to a remote validation device over a network;
    receive, at the local validation device, the plurality of credentials for the plurality of user devices from the remote validation device over the network; and
    distribute, from the local validation device, each of the credentials to its respective user device.

14. The non-transitory computer-readable media of claim 13, wherein the condition comprises a determination that a connection over the network between the local validation device and the remote validation device is available, the non-transitory computer-readable media further including computer-executable instructions that, when executed by the computing system, cause the computing system to monitor an availability of the connection over the network between the local validation device and the remote validation device.

15. The non-transitory computer-readable media of claim 13, further including computer-executable instructions that, when executed by the computing system, cause the computing system to obtain a plurality of device identifiers, each device identifier associated with a different one of the plurality of user devices.

16. A method comprising:
    detecting, at a local validation device, a condition;
    based on the detection of the condition, sending, from the local validation device, a request for a plurality of credentials for a plurality of user devices to a remote validation device over a network;
    receiving, at the local validation device, the plurality of credentials for the plurality of user devices from the remote validation device over the network; and
    distributing, from the local validation device, each of the credentials to its respective user device.

17. The method of claim 16, wherein the condition comprises a determination that a connection over the network between the local validation device and the remote validation device is available, the method further comprising:
    monitoring an availability of the connection over the network between the local validation device and the remote validation device.

18. The method of claim 16, the method further comprising:

obtaining a plurality of device identifiers, each device identifier associated with a different one of the plurality of user devices.

19. The method of claim 16, wherein the condition comprises an expiration of a time interval.

20. The method of claim 16, wherein the condition comprises an availability of a connection over the network between the local validation device and the remote validation device.

* * * * *